United States Patent Office 3,425,013
Patented Jan. 28, 1969

3,425,013
MAGNET-CONTROLLED FERROVARIOMETER
Jury Borisovich Nesvizhsky, Novo-Izmailovsky pr. 37, kv. 68; Sergei Vasilievich Pavlov, V.O. Bolshoi pr. 11, kv. 22; and Gennady Konstantinovich Boronichev, Ligovsky pr. 31, kv. 7, all of Leningrad, U.S.S.R.
Filed Dec. 23, 1966, Ser. No. 604,230
U.S. Cl. 335—296          2 Claims
Int. Cl. H01f 3/00; 7/00

ABSTRACT OF THE DISCLOSURE

A magnet-controlled ferrovariometer in which inductance coils are placed on magnetic material cores whose permeability varies under the effect of a controlling-magnetizing field. The cores are held on three sides by magnetic material plates whose permeability varies under the effect of a controlling magnetizing field and the ferrovariometer is completed by a magnitizing winding encircling the cores, coils and plates for creating a controlling magnetizing field within the cores and plates. A magnetic screen may enclose all of the components and serve as a magnetic conductor for the controlling magnetizing field.

Figure 1:
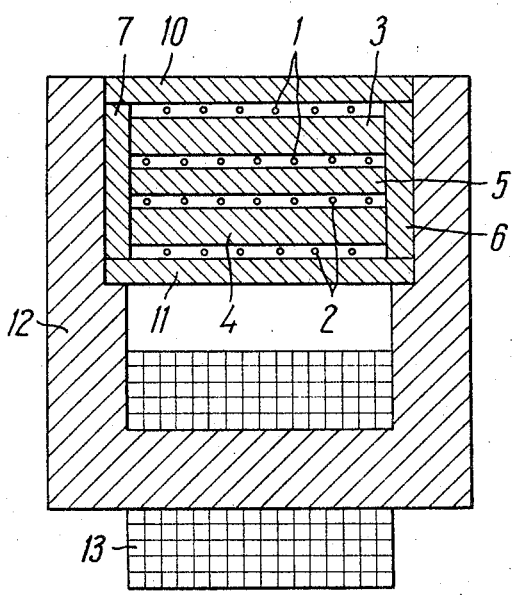

The present invention relates to magnet-controlled ferrovariometers in which inductance is controlled by changing reversible permeability of a ferromagnetic core while magnetizing the latter, and can be used, in particular, in automatic control systems for non-contact retuning of oscillatory circuits.

There is a trend at the present time to use magnet-controlled ferrovariometers for automatic tuning and retuning of resonant circuits of high-power high-frequency oscillators. There exists a number of design alternates of magnet-controlled ferrovariometers which can be utilized for the above-mentioned purposes.

One of such know designs of ferrovariometers has its inductance winding placed on two ferromagnetic legs held on two ends between ferromagnetic plates. These plates serve to create a closed-circuit alternating flux within the core. The entire assembly is accomodated between the poles of an electromagnet whose magnetic field is used to control the value of the ferrovariometer inductance.

Other known designs of magnet-controlled ferrovariometers have ther inductance winding placed on one or more toroidal ferromagnetic cores. As in the former case, such a ferrovariometer is fitted with a device, such as an electromagnet, for creating a magnetizing field within the core to control the inducance of the ferrovariometer. The inductance winding in the above-mentioned designs of ferrovariometers cannot be fully accommodated over the entire length of the ferromagnetic core in case such ferrovariometers are used in high-voltage A.C. lines because of electric breakdown which may arise between the inductance winding and the magnetizing device. As a result, the reluctance for the alternating flux diminishes which causes a reduction in the inductance overlapping coefficient, the latter being the ratio of maximum to minimum inductance of the ferrovariometer. There are at least two more factors causing the reduction of the inductance overlapping coefficient in the above-mentioned designs of ferrovariometers.

One of these factors consists in that the core of such a variometer must be wound with a certain winding pitch to obtain the predetermined initial iductance, and this causes a decrease in reluctance for the alternating magnetic flux and, hence, a decrease in the inductance overlapping coefficient.

The other factor is associated with the difficulty in obtaining a high degree of saturation within the magnetic core of the inductance coil because of the presence of leakage paths for the controlling flux of the magnetizing device. As a result, the minimum value of inductance increases, and the inductance overlapping coefficient diminishes. On the other hand, the increase in the overlapping coefficient by increasing the initial permeability of the inductance coil core can be obtained at the expense of considerable increase of losses which results in a decrease of the Q-factor of the ferrovariometer, which is undesirable.

It is an object of the present invention to obviate the above drawbacks in the known designs of magnet-controlled ferrovariometers.

It is another object of the invention to provide a more effective and smaller size magnetizing device.

It is still another object of the invention to decrease the size and weight of the ferrovariometer and to simplify the process of its manufacture.

With the above and other objects in view, the invention is embodied in a magnet-controlled ferrovariometer comprising magnetic material cores whose permeability varies under the effect of a controlling magnetizing field; inductance coils placed on said cores; magnetic material plates whose permeability varies under the effect of a controlling magnetizing field, said plates holding said cores at least on three sides; and a device for creating a controlling magnetizing field within the mentioned cores and plates.

Figure 2:
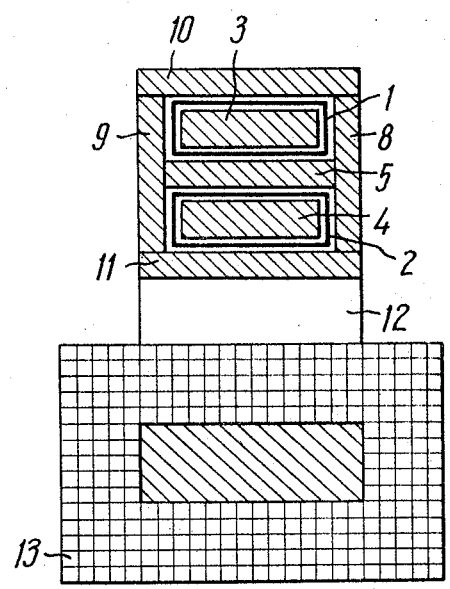
Figure 3:
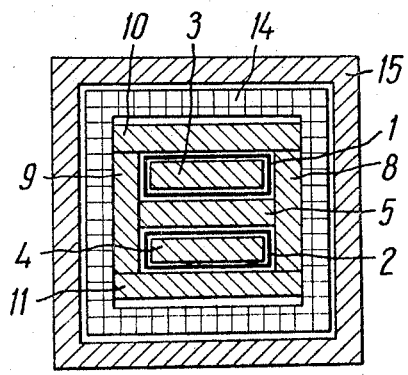
Figure 4:
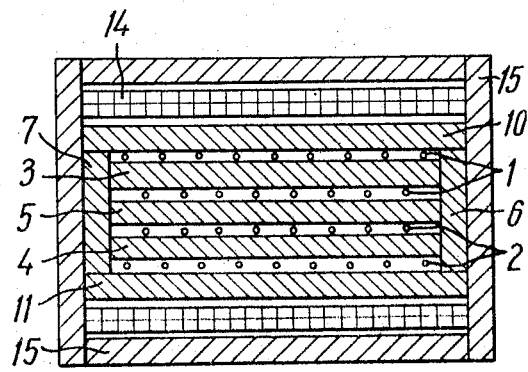

Other objects and advantages of the invention will be best understood from the following description and accompanying drawings, in which:

FIGS. 1 and 2 illustrate two mutually normal sections of one of the preferred embodiments of magnet-controlled ferrovariometers in which the controlling field is created by means of a commonly used electromagnet; and FIGS. 3 and 4 show two mutually normal sections of magnet-controlled ferrovariometers using a magnetizing device with a weak external magnetic field.

Now referring to FIGS. 1 and 2, windings 1 and 2 of the inductance coils are placed on rectangular-section ferrite cores 3 and 4. The alternating magnetic fluxes created by windings 1 and 2 in cores 3 and 4 must be opposing to obtain a maximum inductance overlapping coefficient. If necessary, the inductance coil windings can be placed on a greater number of cores, the rectangular section of the latter being chosen arbitrarily.

Placed between cores 3 and 4 is a ferrite plate 5. Plate 5 is used to prevent electric breakdown between windings 1 and 2. Besides, due to this plate demagnetizing effect of magnetic fluxes created around each turn of windings 1 and 2 is reduced. If the possibility of electric breakdown between windings 1 and 2 is not great, plate 5 can be removed, and cores 3 and 4 spaced at a shorter distance. Ferrite plates 6 and 7 serve to close the alternating magnetic fluxes created in cores 3 and 4. Plates 8, 9, 10, 11 are employed to create a practically closed magnetic medium encircling the inductance winding. Plates 8, 9, 10, 11, like plate 5, reduce the demagnetizing effect of magnetic fluxes set up around each turn of windings 1 and 2.

For improving the cooling conditions of the magnet-controlled ferrovariometer or for any other reasons, plates 10 and 11 or 8 and 9 can be removed. As can be seen from FIGS. 1 and 2, the wound ferrite cores and plates are placed between the poles of electromagnet 12. The permeability of the ferrite cores and plates varies under the effect of a magnetizing field built up by electromagnet winding 13 thereby changing the inductance of the ferrovariometer. The above-described design has a number of advantages as compared to the known types of ferrovariometers. Due to the fact that the inductance coil winding is encircled by a practically closed magnetic medium, the initial inductance of the ferrovariometer is increased. Since a practically homogeneous magnetic medium is created between the electromagnet pole shoes, the final inductance of the ferrovariometer is decreased. As a result, the inductance overlapping coefficient increases, and the magnetizing device becomes more efficient. All the above factors make it possible to reduce the size and weight of the ferrovariometer. Besides, the manufacturing technique of the ferrovariometer is improved due to the use of a simpler method of manufacturing the magnetic cores and winding them as well as due to simplifying the mechanical process of coupling the components in which magnetism is to be reversed (magnetic cores with plates) with the electromagnet poles. The above-described design of a magnet-controlled ferrovariometer possesses a rather strong external magnetic field which may be undesirable in certain cases. To eliminate this drawback the magnetizing device can be made as shown in FIGS. 3 and 4. Therein, magnetizing winding 14 is placed over ferrite plates 8, 9, 10, 11 encircling said plates as well as ferrite cores 3, 4, windings 1, 2 and plate 5.

Magnetizing winding 14, plates 8, 9,; 10, 11, 5, cores 3, 4, and windings 1, 2 are enclosed in magnetic screen 15 which serves at the same time as a magnetic conductor for the controlling magnetic flux created by magnetizing winding 14.

What is claimed is:

1. A magnet-controlled ferrovariometer comprising magnetic material cores whose permeability varies under the effect of a controlling magnetizing field; inductance coils placed on said cores; magnetic material plates whose permeability varies under the effect of a controlling magnetizing field, said plates holding said cores at least on three sides; and a means for creating a controlling magnetizing field within said cores and plates.

2. A magnet-controlled ferrovariometer comprising magnetic material cores whose permeability varies under the effect of a controlling magnetizing field; inductance coils placed on said cores; magnetic material plates whose permeability varies under the effect of a controlling magnetizing field, said plates holding said cores at least on three sides; a means for creating a controlling magnetizing field within said cores, which essentially comprises a magnetizing winding encircling said cores, coils, and plates; and a magnetic screen enclosing all said components and serving as a magnetic conductor for the controlling magnetizing field.

References Cited

UNITED STATES PATENTS 2,721,273    10/1955    Waite _____ 335—209 XR

GEORGE HARRIS, *Primary Examiner.*

U.S. Cl. X.R.

336—155